United States Patent

[11] 3,608,626

| [72] | Inventors | Mikio Yamazaki;<br>Naomasa Sunano, both of Ayabe, Japan |
|---|---|---|
| [21] | Appl. No. | 215 |
| [22] | Filed | Jan. 2, 1970 |
| [45] | Patented | Sept. 28, 1971 |
| [73] | Assignee | Shinyei Co., Inc.<br>Ikuta-ku, Kobe, Japan |
| [32] | Priority | Jan. 7, 1969 |
| [33] | | Japan |
| [31] | | 44/1611 |

[54] APPARATUS FOR AUTOMATICALLY ADJUSTING ROOM TEMPERATURES
4 Claims, 4 Drawing Figs.

[52] U.S. Cl. .................................................. 165/26
[51] Int. Cl. .................................................. F25b 29/00
[50] Field of Search.......................................... 165/26, 27, 28, 39, 40

*Primary Examiner*—Charles Sukalo
*Attorney*—Wenderoth, Lind & Ponack

ABSTRACT: This invention relates to an apparatus for obtaining suitable room temperatures according to every change of season, the environs of working places or office rooms.

The apparatus of the present invention consists of two heat-sensitive semiconductors showing the characteristics of transition of a semiconductor and a metal phase and two heating bodies of different resistance values attached to the semiconductors to constitute two heater-type heat-sensitive elements, each heating body being connected to an electric source, so as to cause heating from said heating body on one hand, and on the other hand, one end of each of the two heat-sensitive semiconductors being connected to the gate of a silicon-control element communicating with a load, namely, the circuit of a cooler and a heater so that the indirectly heated temperature of the cooler or heater can be automatically adjusted by determining the actuating point of the heat-sensitive bodies, namely, the range of changes in room temperature, due to the adjustment of electric current flowing in the circuit of the heating bodies.

MIKIO YAMAZAKI and
NAOMASA SUNANO,

INVENTORs

BY Wenderoth, Lind & Ponack

ATTORNEYS

APPARATUS FOR AUTOMATICALLY ADJUSTING ROOM TEMPERATURES

FIELD OF THE INVENTION

This invention relates to an apparatus for maintaining suitable room temperatures.

BACKGROUND OF THE INVENTION

Various inconvenient factors have heretofore been encountered in the automatic adjustment of temperatures in houses, working places and other places as well, particularly with electric adjustment mechanisms.

SUMMARY OF THE INVENTION

With a view to obviating the above-mentioned inconvenient factors, it is the primary object of the present invention to provide an apparatus for obtaining desired temperatures in any place, whether at home or in any working place.

Thus, the present invention consists in offering an apparatus capable of ensuring maintenance of suitable temperatures while accounting for surrounding environment temperature changes.

The invention will be explained in detail by way of several embodiments with reference to the accompanying drawings.

DETAILED DESCRIPTION OF THE INVENTION

As shown in the accompanying drawings, the present invention consists of providing two heat-sensitive semiconductors having certain resistance and temperature characteristics under the same load, to which are attached two heating bodies of different resistance values, respectively, to constitute two indirectly heated, heater-type heat-sensitive elements activatable at different heating temperatures. The heat-sensitive semiconductor of one of the two indirectly heated heat-sensitive elements is disposed between the gate of a silicon-control element connected to the circuit of a cooler and a partial voltage resistor connected to an electric source, and the heating body thereof is connected to the electric source. The heat-sensitive semiconductor of the other indirectly heated heat-sensitive element is disposed between the gate of a silicon-control element connected to the circuit of a heater and the electric source, and the heating body incorporated therein is also connected to the electric source. A temperature difference due to sudden change in resistance is maintained between the heater-type heat-sensitive elements capable of controlling the operation of the silicon-control elements of the circuits of the cooler and the heater, thereby permitting free selection of the actuating temperature of the cooler and also that of the heater. Namely, two heater-type heat-sensitive elements activatable at temperatures due to sudden changes in resistance are connected to the control circuits of the cooler and the heater, respectively, whereby it is made possible that when a certain surrounding temperature is reached, the cooler is actuated on one hand and when another surrounding temperature is reached, the heater is actuated on the other hand, and at the same time, the room temperature can be adjusted suitably by maintaining or freely changing a difference in the actuating temperatures of the cooler and the heater.

Still further, the invention will be explained in more detail with reference to the accompanying.

Figure 1:
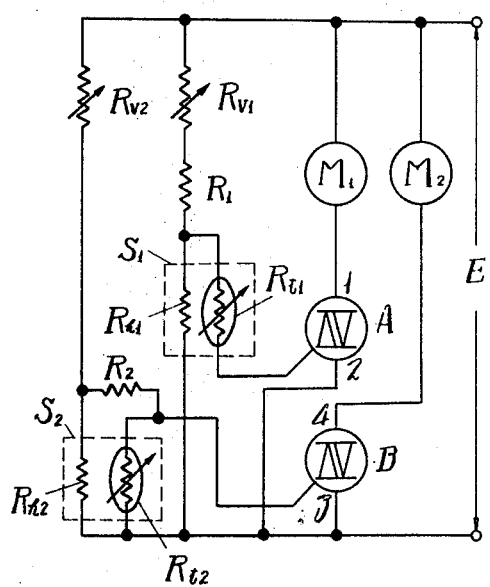
FIG. 1 shows an apparatus for controlling temperatures, which is adapted to be actuated by low voltage or a direct current source.

In FIG. 1, the temperature control apparatus consists of a cooler $M_1$ and a silicon-control element A connected together in series, and voltage from an electric source is provided between one end of the cooler $M_1$ and the principle terminal 2 of the silicon-control element A. A heating body $Rh_1$ of a heater-type heat-sensitive element $S_1$, 1 a partial-voltage resistor $R_1$ for temperature-compensating purposes and a variable resistor $Rv_1$ are connected together in series. Now, voltage from the electric source is provided between the heating body $Rh_1$ and the variable resistor $Rv_1$ and at the same time, a heat-sensitive semiconductor $Rt_1$ of the heater-type heat-sensitive element $S_1$ is disposed between the junction of the heating body $Rh_1$ and the partial-voltage resistor $R_1$ for temperature-compensating purposes, and the terminal of the gate of the silicon-control element A so that it is possible to control the electric current of the gate of the silicon-control element A on the basis of change in resistance of the heat-sensitive semiconductor $Rt_1$ along with the change in the surrounding temperature, thereby permitting current control between the principle terminal 2 of the silicon-control element A and its outlet principle terminal 1. Similarly, the heater $M_2$ is connected to a silicon-control element B in series and voltage from the electric source is provided on both ends thereof. Moreover, the heating body $Rh_2$ of a heater-type heat-sensitive element $S_2$ is connected in series to a variable resistor $Rv_2$, and in parallel to a heat-sensitive semiconductor $Rt_2$ through a partial-voltage resistor $R_2$ for temperature-compensating purposes. The junction between the partial-voltage resistor $R_2$ and the heat-sensitive semiconductor $Rt_2$ is joined to the terminal of a gate of the silicon-control element B to permit voltage control of the gate of the silicon-control element B on the basis of the change in resistance of the heat-sensitive semiconductor $Rt_2$, based on the change in the surrounding temperature, thereby enabling the heater $M_2$ to be actuated.

Figure 2:
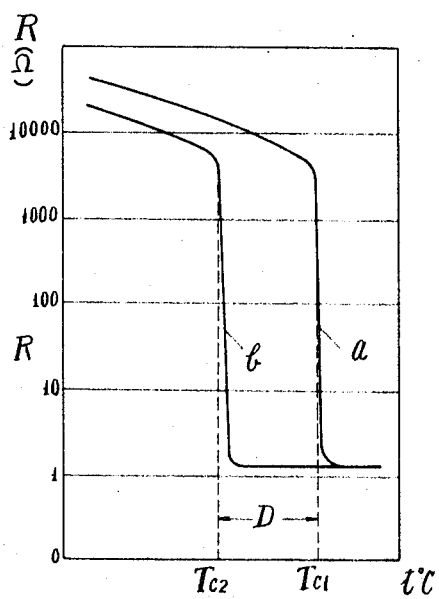
FIG. 2 is a view showing the characteristics of resistance and temperature given by the indirectly heated heat-sensitive elements in the circuits for cooling and also indirectly heated heat-sensitive elements in the circuits for heating of the present invention, with reference to the electric circuits as shown in FIG. 1 etc., thus indicating the establishment of some difference in temperature with reference to the characteristics of resistance and temperature of both indirectly heated heat-sensitive elements.

Although the characteristics of resistance and temperature of the heat-sensitive semiconductor $Rt_1$ and $Rt_2$ of the above-mentioned heater-type heat-sensitive elements $S_1$ and $S_2$, respectively, show the same sudden drop in resistance at a certain temperature such as 65° C., the resistances of the heating bodies $Rh_1$ and $Rh_2$ are different. Thus the difference D (as shown in FIG. 2) between the room temperatures $Tc_1$ and $TC_2$ at which heat-sensitive elements $S_1$ and $S_2$ are actuable is due to characteristics of resistance and temperature $a$ and $b$, respectively. Therefore, it is possible to change the range of the above-mentioned difference D in temperature by changing the heating temperatures of the heating bodies $Rh_1$ and $Rh_2$.

Namely, the characteristics $a$ of resistance and temperature may be changed due to the indirectly heated temperature of the heat-sensitive element $S_1$ on one hand and the characteristics $b$ of resistance and temperature may be changed due to the indirectly heated heat-sensitive element $S_2$ on the other hand. Consequently it is possible to maintain room temperature at a suitable level by changing the difference D in temperature between the temperatures $Tc_1$ and $Tc_2$ due to sudden changes in resistance of the heater-type heat-sensitive elements $S_1$ and $S_2$.

For example, when the surrounding temperature between the heater-type heat-sensitive elements $S_1$ and $S_2$, namely, room temperature at this instant is found to be higher than the temperature $Tc_1$, then a sudden change in resistance, occurs, and $R_1 >> Rt_1$. Thus the voltage drop at $Rt_1$ is so minor that electric current is destined to flow in the circuit of the gate of the silicon-control element A thereby causing electric current between the principle terminal 2 of the silicon-control element A and the principle terminal 1 thereof for actuating the operation of the cooler. At the same time, since $R_2 >> Rt_2$ in the heater-type heat-sensitive element $S_2$, voltage is provided on both ends of the partial voltage resistor $R_2$ so that no sufficient voltage is provided on the terminal of the gate of the silicon-control element B and then no electric current may flow between terminals 3 and 4 of the silicon-control element B for actuating the operation of the heater $M_2$.

In this manner, when room temperature is found to be higher than the temperature $Tc_1$, a sudden change in resistance occurs, and the silicon-control element A remains in the electrically conductive condition whereas the silicon-control element B remains in the electrically nonconductive condition.

On the other hand, when room temperature is found to be lower than the temperature $Tc_2$, then a sudden change in resistance occurs and produces a condition contrary to that above mentioned.

In other words, since the relationship between the heat-sensitive semiconductor $Rt_1$ of the heater-type heat-sensitive element $S_1$ and the resistance $R_1$ for temperature-compensating purposes shows $R_1 << Rt_1$, no sufficient current will flow to the terminal of the gate of the silicon-control element, with the result that there occurs no electric current flowing towards the principle terminal 1 from the principle terminal 2 of the silicon-control element A, because of which the cooler $M_1$ is not actuated. However, there occurs the relationship $R_2 << Rt_2$ between the heat-sensitive semiconductor $Rt_2$ of the heater-type heat-sensitive element $S_2$ and the resistor $R_2$ thereof because of which the voltage between both terminals of the heater-type resistor $Rh_2$ is almost provided between both terminals of the heat-sensitive semiconductor $Rt_2$. That is to say, since said voltage is provided on the gate of the silicon-control element B, the circuit from the principle terminal 3 of the silicon-control element B towards the principle terminal 4 is in the electrically conductive condition so as to actuate the heater $M_2$ in such a manner that it automatically maintains room temperature at all times between the temperatures $Tc_1$ and $Tc_2$.

Therefore, when room temperature remains within the range of the optimum temperature D, there occurs an electrically nonconductive condition between the principle terminals 1 and 2 of the silicon-control element A and also between the principle terminals 4 and 3 of the silicon-control element B so that neither the cooler $M_1$ nor the heater $M_2$ may be actuated. Thus by the use of two heater-type heat-sensitive elements $S_1$ and $S_2$ operable at different temperatures $Tc_1$ and $Tc_2$ due to sudden changes in resistance, it is possible to control the voltage or current of the gates of the silicon-control elements A and B disposed in the circuits of the cooler $M_1$ and the heater $M_2$, thereby permitting automatic adjustment of each temperature of the cooler $M_1$ and the heater $M_2$. It is also possible to select any arbitrary range of temperatures by changing the variable resistances $Rv_2$ and $Rv_1$.

Figure 3:
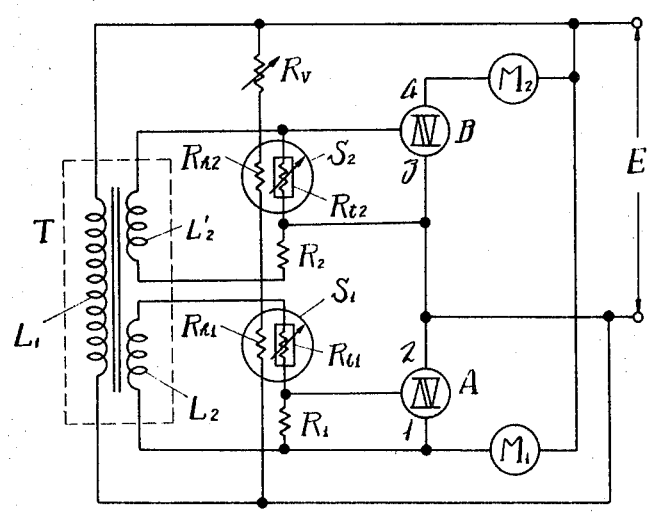
FIG. 3 is a view showing a circuit in an apparatus for automatically controlling the operation of a cooler and a heater by an electric source of high voltage and alternating current, namely, an electric circuit consisting of indirectly heated heat-sensitive elements possessed of the same characteristics as those shown in FIG. 2.

In illustrating a modified form of the invention, the apparatus shown in FIG. 3 can be explained in the same manner as above.

Namely, the circuit of the apparatus shown in FIG. 3 is different from that shown in FIG. 1, only to such an extent that the electric source for both heater-type heat-sensitive elements $S_1$ and $S_2$ is taken from the secondary side of a transformer T.

In further detail, the transformer T is provided such that voltage from the electric source is provided on the primary coil $L_1$ of the transformer T and at the secondary coils $L_2$ and $L_2'$ thereof are provided the heat-sensitive semiconductors $Rt_1$ and $Rt_2$ of both heater-type heat-sensitive elements $S_1$ and $S_2$ and the resistors $R_1$ and $R_2$ in series. Heating bodies $Rh_1$ and $Rh_2$ and a variable resistor $Rv$ are connected in series across the voltage source E.

Then the gate terminal of the silicon-control element A is connected to the junction between the heat-sensitive semiconductor $Rt_1$ and the resistor $R_1$ on one hand. On the other hand, the heat-sensitive semiconductor $Rt_2$ is disposed between the gate terminal of the silicon-control element B and the principle terminal 3 so that the gate of the silicon-control element B can be operated by changing the voltage of the heat-sensitive semiconductor $Rt_2$.

In this instance, the apparatus is characterized by the fact that the transformer T makes it possible to provide high voltage directly and moreover, both silicon-control elements A and B can be controlled by the low-gate voltages provided.

When the heating capacities of the heating bodies of the heater-type heat-sensitive semiconductors $S_1$ and $S_2$ are different from each other, the heating bodies $Rh_1$ and $Rh_2$ are connected together in series so that the electric current flowing in the circuit can be adjusted by means of the variable resistor $Rv$, thereby permitting the adjustment of the range of temperature D between the temperatures $Tc_1$ and $Tc_2$ due to sudden change in temperature of the characteristics $a$ and $b$ of resistance and temperature to control room temperature in an automatic manner, as shown in FIG. 2.

Therefore, in like manner, as shown in FIG. 1, all the above-mentioned operations occur in sequence in such a manner that when room temperature is higher than the temperature $Tc_1$, the resistance of heat-sensitive semiconductor $Rt_1$ decreases such that $R_1 >> Rt_1$ until the voltage at both ends of the resistor $R_1$ can be provided between the terminal of gate of the silicon-control element A and the principle terminal 1 thereof and the element A becomes electrically conductive between the principle terminal 1 and the other principle terminal 2 thereof, whereby cooler $M_1$ can be actuated. At the same time, the resistance of the other heat-sensitive semiconductor $Rt_2$ decreases its such that $R_2 >> Rt_2$ until voltage is almost provided on both ends of the resistor $R_2$ and therefore, voltage is not provided at the gate of the silicon-control element B, which is thus electrically nonconductive between the principle terminal 3 and the principle terminal 4, and the heater $M_2$ cannot be actuated.

Moreover, when room temperature is lower than the temperature $Tc_2$, then as $R_1 << Rt_1$ and $R_2 << Rt_2$, whereby voltage on the secondary side $L_2'$ acts on the heat-sensitive semiconductor $Rt_2$ thus producing a gate voltage. Thus, an electrically conductive condition exists between the principle terminals 3 and 4 of the silicon-control element B, thereby actuating the heater $M_2$. In addition, the voltage of the secondary coil $L_2$ acts on both ends of the heat-sensitive semiconductor $Rt_1$ until insufficient voltage is provided to the gate of the silicon-control element A, which thus becomes electrically nonconductive between the principle terminals 1 and 2, thereby automatically controlling room temperature without actuating the cooler $M_1$. Also, when room temperature remains within the range of the temperatures from $Tc_2$ to $Tc_1$, due to sudden change in resistance, both the cooler $M_1$ and heater $M_2$ can be maintained in the nonactuated condition.

Figure 4:
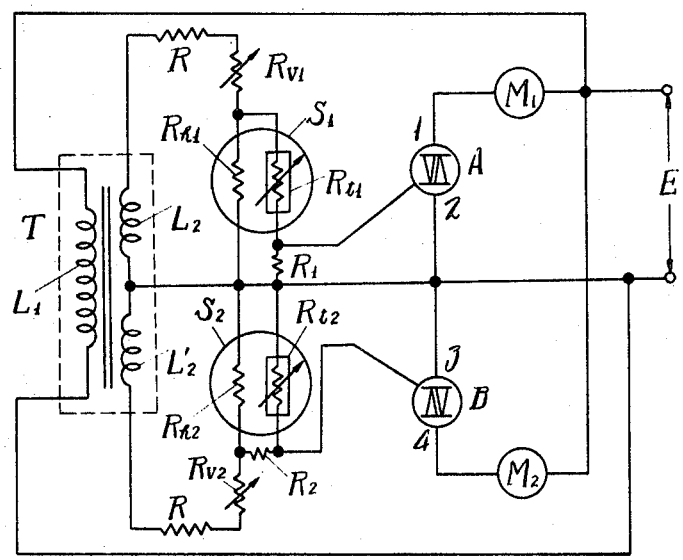
FIG. 4 is a view showing a circuit in an apparatus for automatically controlling the operation of a cooler and a heater by an electric source of high voltage and alternating current in a manner similar to that shown in FIG. 3, namely, another preferred example of a circuit consisting of indirectly heated heat-sensitive elements with the same characteristics of resistance and temperature as those shown in FIG. 2.

FIG. 4 shows another preferred embodiment of the present invention, wherein a high-voltage source can be provided directly using a stepdown transformer. In this case, voltage E from the electric source is provided to the primary coil $L_1$ of the transformer T. The heating body $Rh_1$ of the heater-type heat-sensitive element $S_1$ is connected to the secondary coil $L_2$ through the resistor R and a variable resistor $Rv_1$, and moreover, the heat-sensitive semiconductor $Rt_1$ of the heat-sensitive element $S_1$ is connected to the heating body $Rh_1$ in parallel through the resistor $R_1$ in series. The principle terminals of the silicon-control element A are connected to the circuit of the cooler $M_1$. The junction of the heat-sensitive semiconductor $Rt_1$ and the resistor $R_1$ connected to the gate of silicon-control element A connected to the circuit of the cooler $M_1$. The variable resistor $Rv_2$ and the heating body $Rh_2$ of the heater-type heat-sensitive element $S_2$ are in series to the other secondary coil $L_2'$. The heat-sensitive semiconductor $Rt_2$ is connected to the heating body $Rh_2$ in parallel through the resistor $R_2$. The junction between the heat-sensitive semiconductor $Rt_2$ and the resistor $R_2$ is connected to the gate of the silicon-control element B connected to the circuit of the heater $M_2$, whereby it is made possible to control both the silicon-control elements A and B due to the change in resistance of the heat-sensitive semiconductors $Rt_1$ and $Rt_2$ in the heater-type heat-sensitive elements $S_1$ and $S_2$, respectively.

In this instance, similar to what is shown in FIG. 3, the transformer T makes it possible to provide high voltage on the apparatus directly, and also similar to FIG. 1, it is possible to operate both the silicon-control elements A and B using voltage control and current control in combination. Thus the explanation of operation made in connection with FIG. 1 is applicable to the embodiment of FIG. 4.

In this way, the present invention is intended to provide an apparatus for automatically adjusting temperatures wherein room temperature can be adjusted within an established range of temperatures using two heat-sensitive elements of the heater-type causing actuable at different temperatures due to the change in electric resistance, thereby automatically controlling the operation of a cooler and a heater and permitting free selection and change in the upper and lower limits of the optimum temperature D at will by adjusting indirectly the heating temperature of the heater-type heat-sensitive elements. The present invention provides an apparatus for controlling temperatures, which is capable of changing the aforesaid range of temperature D and ensuring a marked effect and action thereof.

At the same time, it is apparent that other improvements and modifications of the present invention can be made without departing from the spirit or scope thereof.

What is claimed is:

1. An apparatus for automatically adjusting room temperatures comprising an electric source; a cooler and a first silicon-control element having two principle terminals and a gate terminal connected across said electric source; a first heater-type heat-sensitive element including a first heating body and a first heat-sensitive semiconductor across said electric source, said first heat-sensitive semiconductor being connected to said gate terminal of said first silicon-control element; a heater and a second silicon-control element having two principle terminals and a gate terminal connected across said electric source; and a second heater-type heat-sensitive element including a second heating body and a second heat-sensitive semiconductor across said electric source, said second heat-sensitive semiconductor being connected to said gate terminal of said second silicon-control element, the resistance of said second heating element being different from the resistance of said first heating element; wherein said first and second heater-type heat-sensitive elements are adapted to be actuated at different predetermined temperatures to selectively cause said first or second silicon-control elements to be electrically conductive, thereby operating said cooler or said heater.

2. An apparatus as claimed in claim 1, further comprising a first temperature-compensating resistor and a first variable resistor connected in series with said first heating body across said electric source, said first heat-sensitive semiconductor being connected to the junction of said first heating body and said first temperature-compensating resistor; a second variable resistor connected in series with said second heating body across said electric source; and a second temperature-compensating resistor connected to the junction between said second heating body and said second variable resistor and the junction between said second heat-sensitive semiconductor and said gate terminal of said second silicon-control element.

3. An apparatus as claimed in claim 1, wherein said electric source comprises a transformer having a primary coil and first and second secondary coils; and further comprising a variable resistor connected in series with said first and second heating bodies across said primary coil; a first temperature-compensating resistor in series with said first secondary coil and in parallel with said first heat-sensitive semiconductor; and a second temperature-compensating resistor in parallel with said second heat-sensitive semiconductor, said second heat-sensitive semiconductor being in series with said second secondary coil.

4. An apparatus as claimed in claim 1, wherein said electric source comprises a stepdown transformer having a primary coil and first and second secondary coils; and further comprising a first variable resistor in series with said first secondary coil; a second variable resistor in series with said second secondary coil; a first temperature-compensating resistor connected to said first heat-sensitive semiconductor at the junction thereof with said gate terminal of said first silicon control element; and a second temperature-compensating resistor connected to said second heat-sensitive semiconductor at the junction thereof with said gate terminal of said second silicon-control element.